United States Patent
Tasch et al.

(10) Patent No.: US 6,664,698 B1
(45) Date of Patent: Dec. 16, 2003

(54) COMMUTATOR MOTOR

(75) Inventors: Franz Tasch, Rheinstetten (DE); Walter Haussecker, Buehlertal (DE); Robert Hessdoerfer, Karlstadt-Stetten (DE); Rainer Kurzmann, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/744,671

(22) PCT Filed: Apr. 15, 2000

(86) PCT No.: PCT/DE00/01190

§ 371 (c)(1), (2), (4) Date: Apr. 5, 2001

(87) PCT Pub. No.: WO00/74216

PCT Pub. Date: Dec. 7, 2000

(30) Foreign Application Priority Data

May 29, 1999 (DE) .......................... 199 24 631

(51) Int. Cl.⁷ .............................................. H02K 13/00
(52) U.S. Cl. ...................................... 310/239; 310/68 B
(58) Field of Search ................ 310/239, 68 B, 310/233, 231

(56) References Cited

U.S. PATENT DOCUMENTS

| | | | | |
|---|---|---|---|---|
| 5,053,664 A | * | 10/1991 | Kikuta et al. ................ 310/114 |
| 5,319,277 A | * | 6/1994 | Materne et al. .............. 310/239 |
| 5,528,093 A | * | 6/1996 | Adam et al. .................... 310/89 |
| 6,043,576 A | * | 3/2000 | Weber et al. ............. 310/68 B |
| 6,091,171 A | * | 7/2000 | Ohishi et al. ............. 310/68 B |
| 6,127,752 A | * | 10/2000 | Wiesler ..................... 310/68 B |
| 6,201,326 B1 | * | 3/2001 | Klappenbach et al. ..... 310/75 R |
| 6,373,241 B1 | * | 4/2002 | Weber et al. ............. 324/207.2 |
| 6,459,183 B1 | * | 10/2002 | Tasch et al. ................... 310/89 |
| 2002/0047347 A1 | * | 4/2002 | Torii et al. ................ 310/68 B |
| 2002/0149283 A1 | * | 10/2002 | Hager et al. ................ 310/239 |

* cited by examiner

*Primary Examiner*—Thanh Lam
(74) *Attorney, Agent, or Firm*—Ronald E. Greigg

(57) ABSTRACT

Disclosed is a commutator motor, in particular an actuating motor for automotive power accessories such as power window units, sunroofs, and the like, having a brush holder attached to the motor housing and having a device for rotation detection (speed and/or rotation direction) of the motor, which has a pulse generator non-rotatably supported on the motor shaft and at least one pulse receiver affixed to the brush holder, in order to precisely affix the pulse receiver to the brush holder without having to use special fasteners, the pulse receiver is disposed in a positively engaging manner in a pocket formed into the base body and the base body encompasses the pulse generator in a contact-free manner.

16 Claims, 2 Drawing Sheets

COMMUTATOR MOTOR

CROSS-REFERENCE TO RELATED APPLICATIONS

This application is a 35 USC 371 application of PCT/DE 00/01190 filed on Apr. 15, 2000.

BACKGROUND OF THE INVENTION

1. Filed of the Invention

The invention relates to a commutator motor, in particular an actuating motor for automotive power accessories such as power window units, sunroofs, and the like.

2. Description of the Prior Art

In a known commutator motor of type with which this invention is concerned is disclosed in DE 196 53 209 A1 is used for the rotation detection of the motor—in fact for detection of both speed and rotation direction. In this know commutator motor the pulse generator is embodied as a highly pole-magnetized rotor and two pulse receivers fastened to the brush holder are embodied as Hall ICs, which are accommodated on the brush holder in the vicinity of the rotor without a separate individual mount. So that despite a simple manufacture and installation, the most precise possible alignment is assured with a minimal air gap between the rotor on the motor shaft on the one side and the Hall ICs on the brush holder on the other side, the motor housing and a bearing end plate, which is disposed adjacent to the commutator and receives the motor shaft, are provided with alignment means in the vicinity of their mutual mounting contact, e.g. in the form of adapted axial guide pins formed onto the bearing end plate that correspond to axial guide openings on the motor housing, and/or fastening means, e.g. in the form of axial crimping/caulking projections formed onto the bearing end plate that can be inserted through corresponding attachments on the motor housing and then be deformed, in particular caulked, for the purpose of a reciprocal connection.

SUMMARY OF THE INVENTION

The commutator motor according to the invention, has the advantage that through the precisely toleranced placement of the pockets, which are formed in place in the same injection molding step as the brush holder base body, no additional components are required for the adjustment and attachment of the pulse receiver. The end position of the pulse receiver is predetermined in a highly precise manner and the pulse receiver is fixed in this end position with positive engagement. The rotation detection device is suited for automated installation and its manufacturing and installation costs are minimal.

BRIEF DESCRIPTION OF THE DRAWINGS

The invention will be explained in detail in the following description, taken in conjunction with an the drawings, in which.

DESCRIPTION OF THE PREFERRED EMBODIMENT

Figure 1:
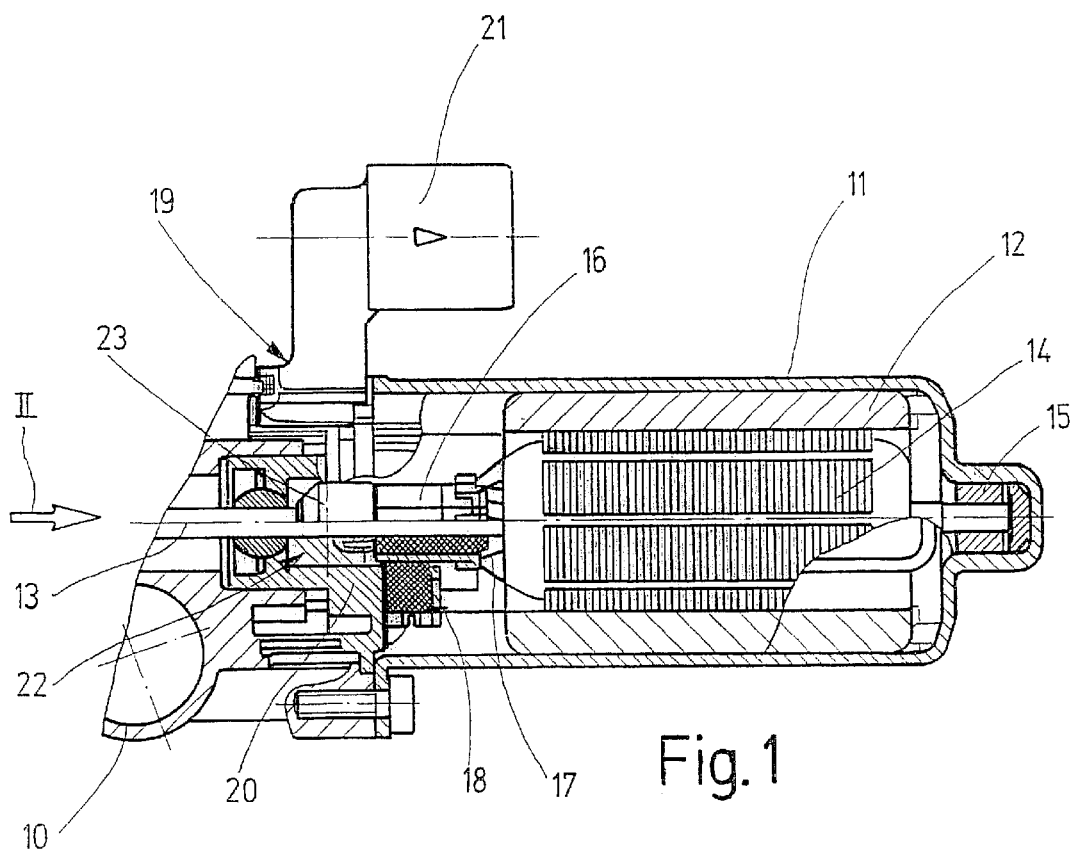
FIG. 1 is a longitudinal sectional view through a motor-and-gear assembly for a power window unit in a motor vehicle.

In a known manner, the motor-and-gear assembly for a power window unit in a motor vehicle, a detail of which is shown in a longitudinal section in FIG. 1, has a transmission housing 10 that contains a transmission, and has a motor housing 11 which is flange-mounted to the transmission housing 10 and belongs to an electric motor embodied as a commutator motor that is excited by permanent magnets. In a known manner, a stator 12 is attached in the motor housing 11 and encloses a rotor 14 that is non-rotatably supported on a rotor shaft 13, leaving an air gap around it. A rotary bearing 15 rotatably supports the rotor shaft 13 in the motor housing 11 and in the transmission housing 10. A commutator 16 is non-rotatably supported on the rotor shaft 13 and its commutator lamellas are connected to the rotor or armature winding 17. The supply of power to the armature winding 17 is achieved by means of current or commutator brushes 18, which are secured to a brush holder 19 and are pressed with a radially aligned spring force against the commutator lamellas disposed on the circumference of the commutator 16. The brush holder 19 has a base body 20, which is affixed in the transmission housing 10 and coaxially encompasses the rotor shaft 13, and has a contact plug 21, which is slid radially onto the base body 20 and supplies power to the commutator brushes 18 secured to the base body 20.

For its function as a power window motor, both the speed and the rotation direction of the commutator motor must be detected, for which purpose a rotation detection device 22 is provided, which in a known manner includes a pulse generator 23 non-rotatably supported on the rotor shaft 13 and two spatially fixed pulse receivers 24 (FIG. 3) that are offset from each other by 90° in the rotation direction. The pulse receivers 24 20 are affixed to the base body 20 of the brush holder 19. In the exemplary embodiment of the rotation detection device 22 described here, the pulse generator 23 is embodied as an annular magnet which is encompassed in a contact-free manner by the base body 20 of the brush holder 18 and each of the pulse receivers 24 is embodied as a so-called Hall sensor. The manner in which the ring magnet functions in connection with the two Hall sensors is known and therefore does not require detailed discussion here.

Figure 2:
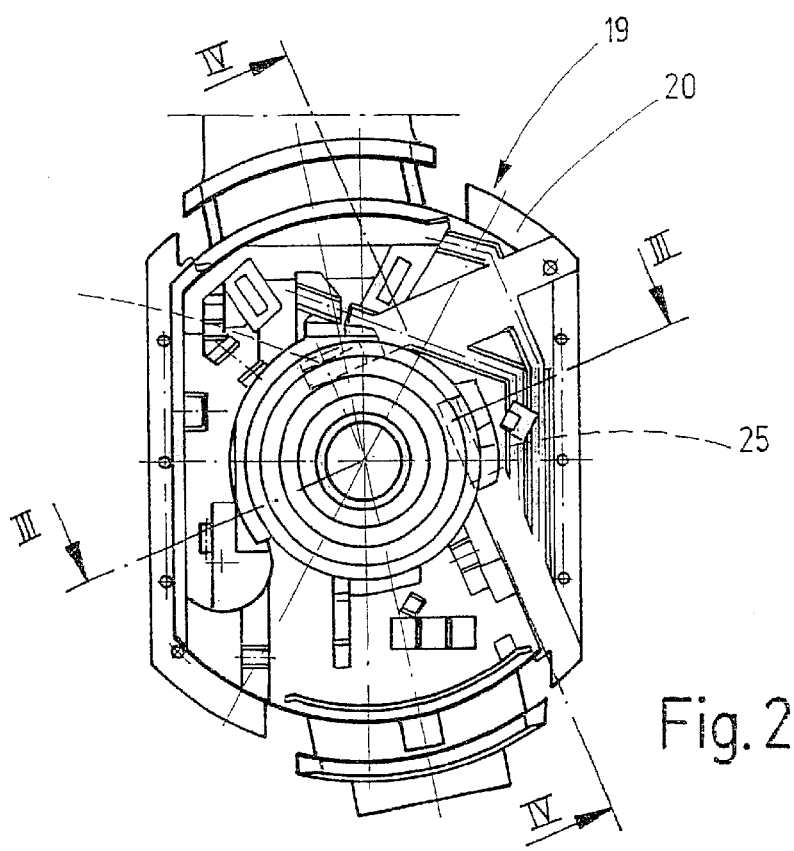
FIG. 2 a plan view of a brush holder base employed body in the commutator motor according to FIG. 1, in the direction of the arrow II in FIG. 1.
Figure 4:
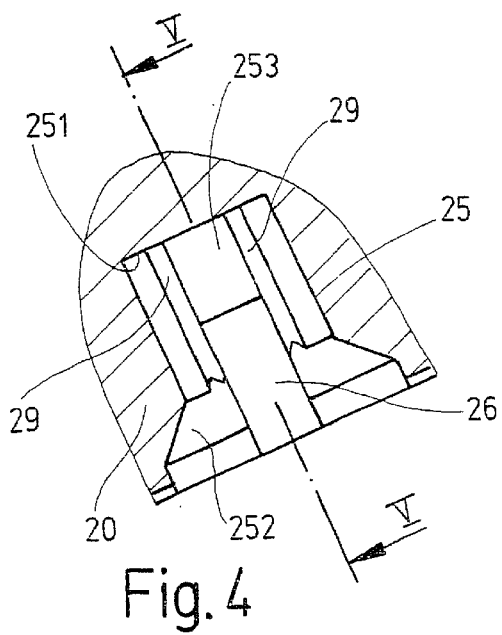
FIG. 4 is a sectional view taken along the line IV—IV in FIG. 2.
Figure 5:
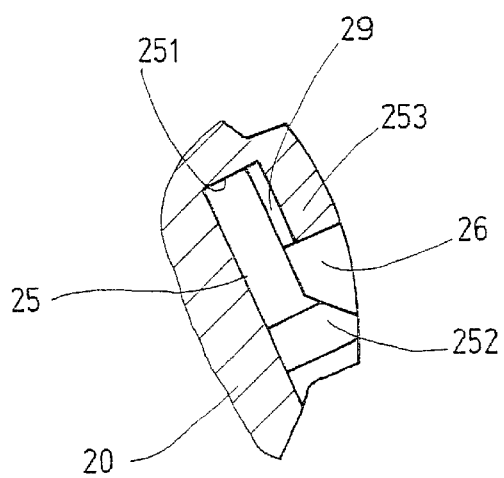
FIG. 5 is a sectional view taken along the line V—V in FIG. 4.

FIG. 2 shows a top view of the base body 20 of the brush holder 19. Two pockets 25 are formed into the base body 20 to contain the pulse receivers 24; these pockets 25 are offset from each other by 90° in the circumference direction and have the same radial distance from the base body axis. A pulse receiver 24 is slid in a positively engaging manner into each of these pockets 25 and in its end position, is aligned in a highly precise manner in relation to the pulse generator 23. In the top view of the base body 20 of the brush holder 19 shown in FIG. 2, the pockets 25 are indicated with dashed lines and can be seen in more detail in the sectional depictions according to FIGS. 3 to 5. The longitudinal axis of the pockets 25 extends tangentially to the pulse generator 23 non-rotatably supported on the rotor shaft 1 and each of the pulse receivers 24 is slid into its respect pocket 25 until it reaches the pocket bottom 251, wherein the pocket 25 contains the pulse receiver 24 in a positively engaging manner. The pocket bottom 251 constitutes a stop when the pulse receiver 24 is inserted and defines the end position of the pulse receiver 24 in the longitudinal axis of the pocket 25. The end position of the pulse receiver 24 against the pocket bottom 251 can be optically and mechanically checked by means of a control opening 26 (FIGS. 4 and 5 let into the pocket 25. As shown in FIGS. 4 and 5, in which the pocket 25 is shown in two different sectional views without the pulse receiver 24 inserted into it, the pocket a funnel-shaped pocket opening 252 which makes it significantly easier to insert the pulse receiver 24.

Figure 3:
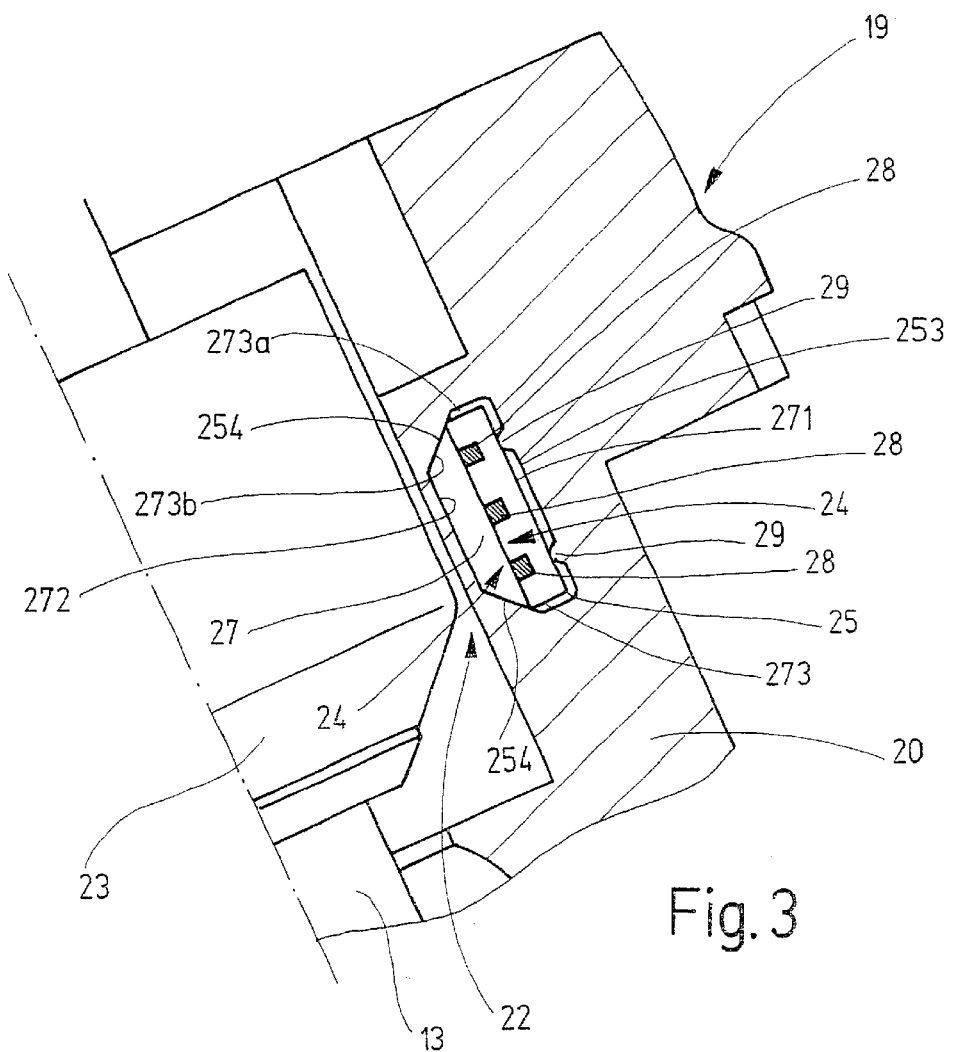
FIG. 3 is a sectional view taken along the line III—III in FIG. 2.

FIG. 3 shows a sectional view of the pocket 25 with a pulse receiver 24 inserted into it. The pulse receiver 24, which is embodied as a Hall sensor, has a housing 27 that contains the Hall element and has three connecting lugs 28 protruding from it. When the pulse receiver 24 is disposed in its end position inside the pocket 25, the connection lugs 28, which protrude axially from the pocket 25 and are connected in an electrically conducting fashion to connecting pins disposed in the contact plug 21 by means of electrical connecting strips. The housing 27 of the pulse receiver 24 has a bottom wall 271, two side walls 273, and a top wall 272 that extends parallel to and spaced apart from the bottom wall 271 and is smaller in area than it. The side walls 273 each have a first side wall section 273a and a side wall section 273b. The two side wall sections 273a extend parallel to each other, while the side wall sections 273b extend inward trapezoidally toward the top wall 272. When the pulse receiver 24 is slid into the pocket 25, the housing 27 of the pulse receiver 24 is supported with its bottom wall 271 against two axial ribs 29 that are spaced apart from each other and are embodied as so-called sliding ribs, which protrude from the one pocket wall 253, and is supported with its trapezoidally tapering side wall sections 273b against inclined surfaces 254 embodied in the pocket 25, which are disposed opposite from the pocket wall 253 with the axial ribs 29. The height of the axial ribs 29 increases slightly toward the bottom of the pocket so that in the end position of the housing 27 that is defined by the pocket bottom 251, the housing 27 is pressed against the inclined surfaces 254 and the axial ribs 29. As a result, the radial distance between the pulse generator 23 and the pulse receiver 24 is exactly defined.

The foregoing relates to preferred exemplary embodiments of the invention, it being understood that other variants and embodiments thereof are possible within the spirit and scope of the invention, the latter being defined by the appended claims.

What is claimed is:

1. A commutator motor, in particular an actuating motor for automotive power accessories comprising a commutator (16) non-rotatably supported on a motor shaft (11), a brush holder (19) which has a base body (20) attached to a motor housing (11) and commutator brushes (18) secured to the base body (20), which commutator brushes (18) rest with frictional engagement against the commutator circumference, and a rotation detection device (22) for detecting speed and/or rotation direction of the motor, said rotation detection device having a pulse generator (23) non-rotatably supported on the motor shaft (13) and at least one pulse receiver (24), in particular a Hall sensor, affixed to the brush holder (19), said base body (20) of the brush holder (19) encompassing the pulse generator (23) in a contact-free manner, and said at least one pulse receiver (24) being contained in a positively engaging manner in a pocket (25) formed Into the base body (20).

2. The motor according to claim 1, wherein the longitudinal axis of the at least one pocket (25) is aligned approximately tangential to the motor shaft (13) and that the pulse receiver (24) is slid into the pocket (25) in a positively engaging fashion until it comes into contact with the pocket bottom (251).

3. The motor according to claim 2, further comprising a control opening (26) let into the pocket (25) at right angles to its longitudinal axis and externally adjoining the base body (20) and feeds into the pocket (25).

4. The motor according to claim 3, wherein the base body (20) of the brush holder (19), two identical pockets (25) are each provided to contain a respective pulse receiver (24), which are disposed offset from each other by 90° in the rotation direction of the motor shaft (13).

5. The motor according to claim 3, wherein the pulse generator (23) is an annular magnet.

6. The motor according to claim 2, wherein the pulse receiver (24) has a housing (27) with a bottom wall (271), a top wall (272), and two side walls (273), that the side walls (273), at least dose to the top wall (272), have side wall sections (273b) which extend inward trapezoidally, and that the housing (27) is supported on one side with its bottom wall (271) against axial ribs (29), preferably sliding ribs that protrude from the one pocket wall (253), and is supported on the other side with its side wall sections (273b) against inclined surfaces (254) embodied in the pocket (25).

7. The motor according to claim 2, wherein the pulse receiver (24) has a housing (27) with a bottom wall (271), a top wall (272), and two side walls (273), that the side walls (273), at least close to the top wall (272), have side wall sections (273b) which extend inward trapezoidally, and that the housing (27) is supported on one side with its bottom wall (271) against axial ribs (29), preferably sliding ribs that protrude from the one pocket wall (253), and is supported on the other side with its side wall sections (273b) against inclined surfaces (254) embodied in the pocket (25).

8. The motor according to claim 2, wherein the base body (20) of the brush holder (19), two identical pockets (25) are each provided to contain a respective pulse receiver (24), which are disposed offset from each other by 90° in the rotation direction of the motor shaft (13).

9. The motor according to claim 2, wherein the base body (20) of the brush holder (19), two identical pockets (25) are each provided to contain a respective pulse receiver (24), which are disposed offset from each other by 90° in the rotation direction of the motor shaft (13).

10. The motor according to claim 2, wherein the pulse generator (23) Is an annular magnet.

11. The motor according to claim 1, wherein the pulse receiver (24) has a housing (27) with a bottom wall (271), a top wall (272), and two side walls (273), that the side walls (273), at least close to the top wall (272), have side wall sections (273b) which extend inward trapezoidally, and that the housing (27) is supported on one side with its bottom wall (271) against axial ribs (29), preferably sliding ribs that protrude from the one pocket wall (253), and is supported on the other side with its side wall sections (273b) against Inclined surfaces (254) embodied in the pocket (25).

12. The motor according to claim 11, wherein the rib height of the axial ribs (29) increases slightly toward the pocket bottom (251).

13. The motor according to claim 11, wherein the pulse generator (23) is an annular magnet.

14. The motor according to claim 1, wherein the base body (20) of the brush holder (19), two identical pockets (25) are each provided to contain a respective pulse receiver (24), which are disposed offset from each other by 90° in the rotation direction of the motor shaft (13).

15. The motor according to claim 14, wherein the pulse generator (23) is an annular magnet.

16. The motor according to claim 1, wherein the pulse generator (23) is an annular magnet.

* * * * *